United States Patent
Xu

(10) Patent No.: US 12,382,442 B2
(45) Date of Patent: Aug. 5, 2025

(54) SYSTEMS AND METHODS FOR VALID SUBFRAME DETERMINATION

(71) Applicant: ZTE Corporation, Shenzhen (CN)

(72) Inventor: Jing Xu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 18/417,131

(22) Filed: Jan. 19, 2024

(65) Prior Publication Data

US 2024/0163851 A1    May 16, 2024

Related U.S. Application Data

(63) Continuation of application No. 17/265,885, filed as application No. PCT/CN2018/099620 on Aug. 9, 2018, now Pat. No. 11,917,593.

(51) Int. Cl.
*H04W 72/0446* (2023.01)
*H04L 5/00* (2006.01)
*H04W 48/12* (2009.01)

(52) U.S. Cl.
CPC ....... *H04W 72/0446* (2013.01); *H04L 5/0053* (2013.01); *H04W 48/12* (2013.01)

(58) Field of Classification Search
CPC . H04W 72/0446; H04W 72/51; H04W 72/23; H04W 48/12; H04W 8/24; H04W 74/0833; H04L 5/0053
See application file for complete search history.

(56) References Cited

U.S. PATENT DOCUMENTS

| | | |
|---|---|---|
| 2015/0249985 A1 | 9/2015 | Han et al. |
| 2018/0048444 A1 | 2/2018 | Park et al. |
| 2020/0221481 A1* | 7/2020 | Park ................. H04W 72/0466 |

FOREIGN PATENT DOCUMENTS

| | | |
|---|---|---|
| CN | 107079247 A | 8/2017 |
| EP | 3240332 A1 | 11/2017 |
| WO | WO2018067057 A1 | 4/2018 |

OTHER PUBLICATIONS

Communication of the European Patent Office regarding Application No. 18 929 719.5 dated Jun. 5, 2024, 3 pages.

(Continued)

*Primary Examiner* — Jianye Wu
(74) *Attorney, Agent, or Firm* — Crowell & Moring LLP

(57) ABSTRACT

A system and method for valid subframe determination between a base station and user equipment based on transmission of an additional system information block are disclosed herein. In one embodiment, a method performed by a communication device includes: receiving a SystemInformationBlockType1 message in a first subframe of a frame from a communication node; receiving the SystemInformationBlockType1 message in a second subframe of the frame from the communication node based on communication device capability for processing the SystemInformationBlockType1 message in the second subframe; sending a radio resource control signal to the communication node based on the communication device capability for processing the SystemInformationBlockType1 message in the second subframe; and utilizing the second subframe as either a valid subframe or an invalid subframe based on the communication device capability for processing the SystemInformationBlockType1 message in the second subframe.

12 Claims, 7 Drawing Sheets

(56) References Cited

OTHER PUBLICATIONS

International Search Report and Written Opinion regarding PCT/CN2018/09962 dated May 7, 2019, 6 pages.
Huawei et al., ONMTC SIB transmission, R1-156917, Nov. 22, 2015, 4 pages.
Nokia et al., "SIB1 transmission requirement," r2-1809913, Jul. 6, 2018, 3 pages.
Extended European Search Report regarding EP 18 92 9719 dated Jul. 21, 2020, 12 pages.
"3rd Generation Partnership Project; Technical Specification Group Radio Access Network; Evolved Universal Terrestrial Radio Access; Physical layer procedures (Release 15)," 3G PP Standard; Technical Specification; 3G PP TS 36.213; Sophia-Antipolis, France, Jul. 19, 2018, pp. 472-525.
"3rd Generation Partnership Project; Technical Specification Group Radio Access Network; Evolved Universal Terrestrial Radio Access; (Release 15)," 3G PP Standard; Technical Specification; 3G PP TS 36.306; Sophia-Antipolis, France, Jul. 16, 2018, pp. 1-98.
"3rd Generation Partnership Project; Technical Specification Group Radio Access Network; Evolved Universal Terrestrial Radio Access", 3G PP Draft, Sophia-Antipolis, France, Jul. 9, 2018.
Huawei et al., "Introduction of additional SIB1-NB transmissions in 36.331," 3G PP Draft, Sophia-Antipolis, France, Nov. 17, 2017.
Japanese Office Action and English translation of Official Action regarding 2021-506334 dated Aug. 18, 2022.
3rd Generation Partnership Project; Technical Specification Group Radio Access Network; Evolved Universal Terrestrial Radio Access (E-UTRA); Radio Resource Control (RRC); Protocol specification (Release 15), 3GPP TS 36.331 V15.1.0, Aug. 3, 2018, pp. 38-42, pp. 628-647, and pp. 678-681.
Chinese Office Action and English translation of Office Action regarding 201880096293.4 dated Aug. 15, 2022.
14 UE procedures related to Sidelink, 3GPP TS 36.213 V15.2.0, Jun. 2018, 53 pages.
3rd Generation Partnership Project; Technical Specification Group Radio Access Network; Evolved Universal Terrestrial Radio Access (E-UTRA); User Equipment (UE) radio access capabilities (Release 15), 3GPP TS 36.306 V15.1.O(Jul. 2018), 98 pages.
Korean Office Action with English translation regarding 10-2021-7003724 dated Oct. 5, 2022, 10 pages.
Samsung, R2-180773, "Introducing Wis endorsed for ASN," 1 review of 36.331 REL-15 second drop, 3GPP TSG RAN WG2 #AHS, Jul. 8, 2018.
3GPP, TS36.306 v15.1.0, "Evolved Universal Terrestrial Radio Access (E-UTRA)," User Equipment (UE) radio access capabilities, Jul. 16, 2018.
3GPP, TS36.213 v13.10.0, "Evolved Universal Terrestrial Radio Access (E-UTRA)," Physical layer procedures, Jul. 19, 2018.
Australian Examiner's Report regarding 2018435705 dated Dec. 22, 2022, 4 pages.
European Patent Office Intention to Grant a Patent regarding Application No. 18 929 719.5 dated Apr. 17, 2025 (8 pages).
European Patent Office Office Action regarding Application No. 18 929 719.5 dated Dec. 6, 2024, 7 pages.

\* cited by examiner

SYSTEMS AND METHODS FOR VALID SUBFRAME DETERMINATION

CROSS-REFERENCE TO RELATED APPLICATION

This application is a continuation application of U.S. application Ser. No. 17/265,885 filed on Feb. 4, 2021, which is herein incorporated by reference in its entirety. The U.S. application Ser. No. 17/265,885 is a national stage application, filed under 35 U.S.C. § 371, of International Patent Application No. PCT/CN2018/099620, filed with the China National Intellectual Property Administration, PRC on Aug. 9, 2018, which is herein incorporated by reference in its entirety.

TECHNICAL FIELD

This disclosure relates generally to wireless communications and, more particularly, to systems and methods for valid subframe determination between a base station and user equipment based on transmission of an additional system information block.

BACKGROUND

As the number of applications and services for digital data continues to explode, the demands and challenges placed on network resources and operators will continue to increase. Being able to deliver a wide variety of network performance characteristics that future services will demand is one of the primary technical challenges faced by service providers today.

For the narrowband internet of things (NB-IoT), a SystemInformationBlockType1 (SIB1) (e.g., SIB1 message) may be transmitted in subframe 4 (e.g., a fifth subframe in time within a frame, with the first subframe in time within a frame noted as subframe 0) and may be repeated up to 16 times within a transmission period (e.g., within a 2560 millisecond transmission period). Certain base stations (BSes) may also repeat the same SIB1 of subframe 4 in subframe 3 (e.g., a fourth subframe in time within the frame). This SIB1 within subframe 3 may be referred to as an additional SIB1 in subframe 3, to contrast with the SIB1 in subframe 4.

Within the NB-IoT system, a BS may indicate whether the BS transmits an additional SIB1 in subframe 3 through in an additionalTransmissionSIB1 field of a master information block (MIB). As noted above, the SIB1 in both subframes 3 and 4 may be the same. Also, subframes 3 and 4 may be within a same frame (e.g., radio frame).

Also, a BS may transmit a bitmap that indicates whether subframe 3 containing the additional SIB1 is invalid (e.g., reserved for specific messages and not available for dynamic data allocation, such as dynamic data allocation with the additional SIB1). Stated another way, the BS may transmit the bitmap (e.g., a DL-Bitmap-NB) in the MIB to indicate which subframes are valid or invalid.

Certain user equipment (UE) may not support the receipt of the additional SIB1 in subframe 3. For example, such UEs may only support the receipt of the SIB1 in subframe 4 and not subframe 3. Reference to supporting receipt of a signal may refer to a UE being capable of, or configured to, properly process the received signal.

In contrast, a UE that supports receipt of the additional SIB1 in subframe 3 may also support subframe 3 as a valid subframe. For example, a bitmap may be transmitted from a BS for over 10 milliseconds to indicate that subframe 3 is an invalid subframe. However, the BS may also transmit subframe 3 with the additional SIB1 dynamically allocated to subframe 3. In such a situation, a UE that supports receipt or processing of the additional SIB1 in subframe 3 may also support having the subframe 3, when not containing the additional SIB1, as a valid subframe for the UE. By being a valid subframe for the UE, the UE may receive and process dynamically modulated data in subframe 3 in a UE-specific search space. Accordingly, there is a need to harmonize understanding between a BS and a UE of whether subframe 3 is a valid subframe for receipt of the additional SIB1.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In one embodiment, a method performed by a communication device includes: receiving a SystemInformationBlockType1 message in a first subframe of a frame from a communication node; receiving the SystemInformationBlockType1 message in a second subframe of the frame from the communication node based on communication device capability for processing the SystemInformationBlockType1 message in the second subframe; sending a radio resource control signal to the communication node based on the communication device capability for processing the SystemInformationBlockType1 message in the second subframe; and utilizing the second subframe as either a valid subframe or an invalid subframe based on the communication device capability for processing the SystemInformationBlockType1 message in the second subframe.

In a further embodiment, a method performed by a communication node includes: sending a SystemInformationBlockType1 message in a first subframe of a frame to a communication device; sending the SystemInformationBlockType1 message in a second subframe of the frame to the communication device; receiving a capability message characterizing receipt of the SystemInformationBlockType1 message at the communication device; determining, based on the capability message, whether the second subframe is a valid subframe that is valid for the communication device to at least one of: monitor a narrowband physical downlink control channel (NPDCCH) communication device specific search space, and decode a narrowband physical downlink shared channel (NPDSCH) transmission scheduled by the NPDCCH in a communication device specific search space; and utilizing the second subframe as either the valid subframe or an invalid subframe based on the determining.

In a further embodiment, a communication device includes: a receiver configured to: receive a SystemInformationBlockType1 message in a first subframe of a frame from a communication node, and receive the SystemInformationBlockType1 message in a second subframe of the frame from the communication node based on communication device capability for processing the SystemInformationBlockType1 message in the second subframe; and a transmitter configured to: send a radio resource control signal to the communication node based on the communication device capability for processing the SystemInformationBlockType1 message in the second subframe; and at least one processor configured to: utilize the second subframe as either a valid subframe or an invalid subframe based on the communication device capability for processing the SystemInformationBlockType1 message in the second subframe.

In a further embodiment, a communication node includes: a transmitter configured to: send a SystemInformationBlockType1 message in a first subframe of a frame to a communication device, and send the SystemInformationBlockType1 message in a second subframe of the frame to the communication device; a receiver configured to: receive a capability message characterizing receipt of the SystemInformationBlockType1 message at the communication device; and at least one processor configured to: determine, based on the capability message, whether the second subframe is a valid subframe that is valid for the communication device to at least one of: monitor a narrowband physical downlink control channel (NPDCCH) communication device specific search space, and decode a narrowband physical downlink shared channel (NPDSCH) transmission scheduled by the NPDCCH in a communication device specific search space, and utilize the second subframe as either the valid subframe or an invalid subframe based on the determination.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention to facilitate the reader's understanding of the invention. Therefore, the drawings should not be considered limiting of the breadth, scope, or applicability of the invention. It should be noted that for clarity and ease of illustration these drawings are not necessarily drawn to scale.

DETAILED DESCRIPTION OF EXEMPLARY EMBODIMENTS

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

The discussion below may refer to functional entities or processes which are similar to those mentioned above with respect to conventional communication systems. As would be understood by persons of ordinary skill in the art, however, such conventional functional entities or processes do not perform the functions described below, and therefore, would need to be modified or specifically configured to perform one or more of the operations described below. Additionally, persons of skill in the art would be enabled to configure functional entities to perform the operations described herein after reading the present disclosure.

Figure 1:
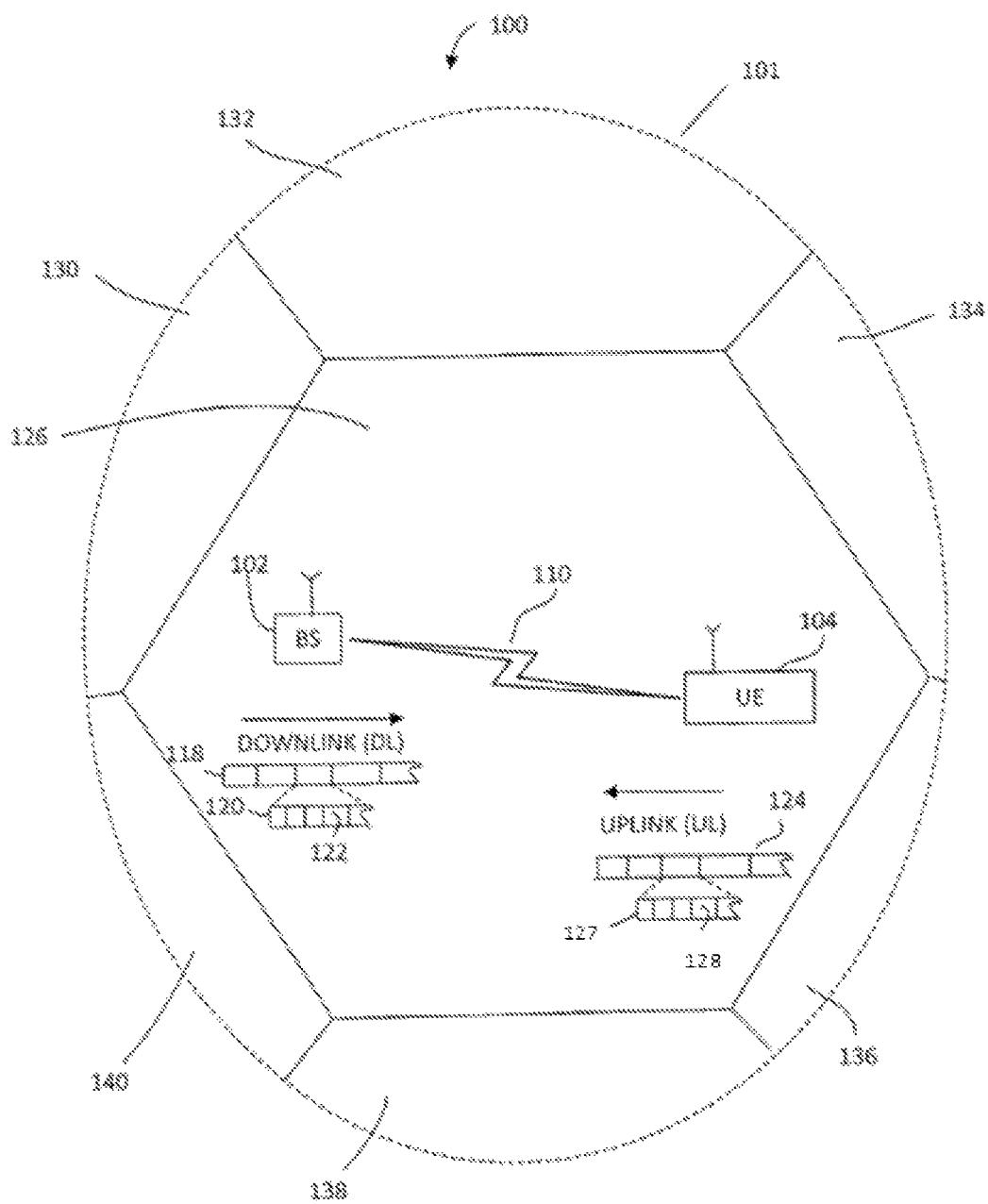
FIG. 1 illustrates an exemplary cellular communication network in which techniques disclosed herein may be implemented, in accordance with an embodiment of the present disclosure.

FIG. 1 illustrates an exemplary wireless communication network 100 in which techniques disclosed herein may be implemented, in accordance with an embodiment of the present disclosure. Such an exemplary network 100 includes a base station 102 (hereinafter "BS 102") and a user equipment device 104 (hereinafter "UE 104") that can communicate with each other via a communication link 110 (e.g., a wireless communication channel), and a cluster of notional cells 126, 130, 132, 134, 136, 138 and 140 overlaying a geographical area 101. A UE 104 may undergo a random access procedure to join the network 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users. Accordingly, reference to a cell may be a short hand reference to a BS with an associated coverage region or area. In certain embodiments, a cell may be interchangeably referred to as a BS.

For example, the BS 102 may operate at an allocated channel transmission bandwidth (e.g., spectrum) to provide adequate coverage to the UE 104. The spectrum may be regulated to define a licensed range and/or an unlicensed range. The BS 102 and the UE 104 may communicate via a downlink radio frame 118, and an uplink radio frame 124 respectively. The radio frames may also be referred to more simply as a frame. Each frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the invention. In certain embodiments, a communication device may refer more specifically to a UE and a communication node may refer more specifically to a BS in relation to the UE.

Figure 2:
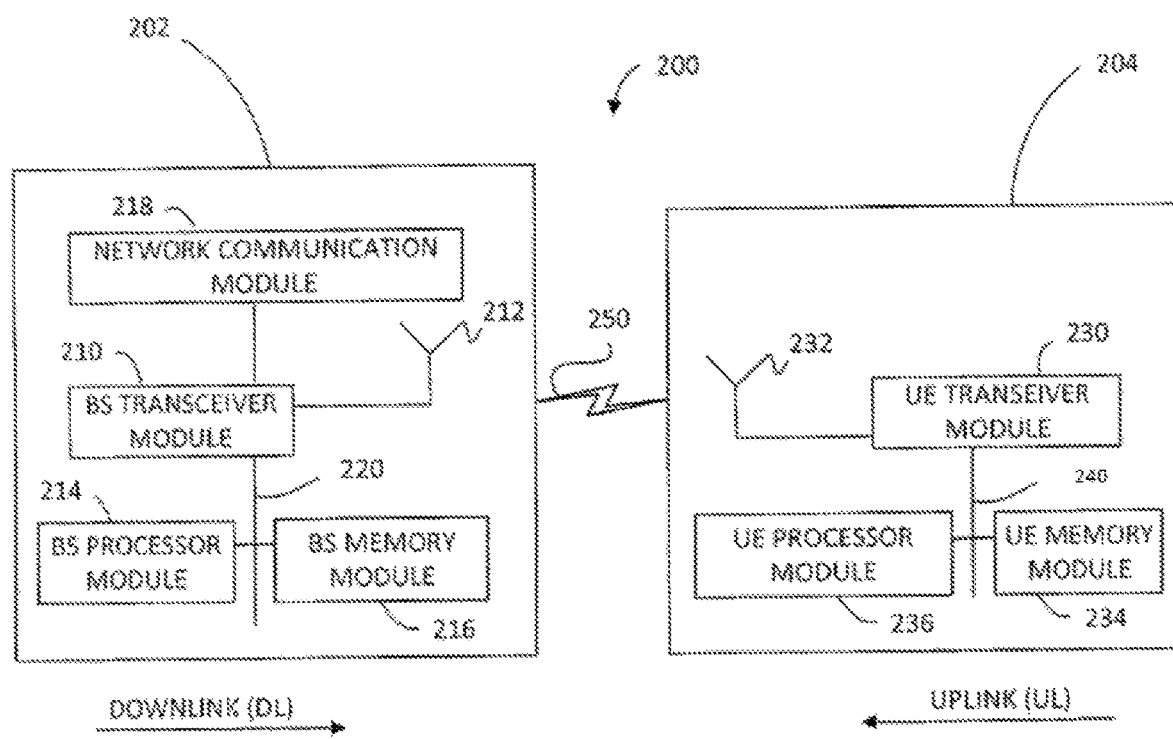
FIG. 2 illustrates block diagrams of an exemplary base station (BS) and a user equipment (UE) device, in accordance with some embodiments of the present disclosure.

FIG. 2 illustrates a block diagram of an exemplary wireless communication system 200 for transmitting and receiving wireless communication signals (e.g., OFDM/OFDMA signals) in accordance with some embodiments of the invention. The system 200 may include components and elements configured to support known or conventional operating features that need not be described in detail herein. In one exemplary embodiment, system 200 can be used to transmit and receive data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium known in the art suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

In accordance with some embodiments, the UE transceiver module 230 may be referred to herein as an "uplink" transceiver module 230 that includes a RF transmitter and receiver circuitry that are each coupled to the antenna 232. A duplex switch (not shown) may alternatively couple the uplink transmitter or receiver to the uplink antenna in time duplex fashion. Similarly, in accordance with some embodiments, the BS transceiver module 210 may be referred to herein as a "downlink" transceiver module 210 that includes RF transmitter and receiver circuitry that are each coupled to the antenna 212. A downlink duplex switch may alternatively couple the downlink transmitter or receiver to the downlink antenna 212 in time duplex fashion. The operations of the two transceiver modules 210 and 230 are coordinated in time such that the uplink receiver is coupled to the uplink antenna 232 for reception of transmissions over the wireless transmission link 250 at the same time that the downlink transmitter is coupled to the downlink antenna 212. Preferably there is close time synchronization with only a minimal guard time between changes in duplex direction.

The UE transceiver module 230 and the BS transceiver module 210 are configured to communicate via the wireless data communication link 250, and cooperate with a suitably configured RF antenna arrangement 212/232 that can support a particular wireless communication protocol and modulation scheme. In some exemplary embodiments, the UE transceiver module 210 and the BS transceiver module 210 are configured to support industry standards such as the Long Term Evolution (LTE) and emerging 5G standards, and the like. It is understood, however, that the invention is not necessarily limited in application to a particular standard and associated protocols. Rather, the UE transceiver module 230 and the BS transceiver module 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage and/or computer-readable medium known in the art. In this regard, memory modules 216 and 234 may be coupled to the transceiver modules 210 and 230, respectively, such that the transceiver modules 210 and 230 can read information from, and write information to, memory modules 216 and 234, respectively. The memory modules 216 and 234 may also be integrated into their respective transceiver modules 210 and 230. In some embodiments, the memory modules 216 and 234 may each include a cache memory for storing temporary variables or other intermediate information during execution of instructions to be executed by transceiver modules 210 and 230, respectively. Memory modules 216 and 234 may also each include non-volatile memory for storing instructions to be executed by the transceiver modules 210 and 230, respectively.

The network communication module 218 generally represents the hardware, software, firmware, processing logic, and/or other components of the base station 202 that enable bi-directional communication between the BS transceiver module 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that the BS transceiver module 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically or virtually constructed, programmed, formatted and/or arranged to perform the specified operation or function.

As noted above, a system information block type 1, or SystemInformationBlockType1 (SIB1) message may be transmitted on a subframe 3 and a subframe 4 within a frame. Reference to subframe 3 may refer to a fourth subframe in time within a frame of contiguous subframes (e.g., a subframe that follows subframe 0, subframe 1, and subframe 2). Similarly, reference to subframe 4 may refer to a fifth subframe in time within a frame of contiguous subframes (e.g., the subframe that follows subframe 3, subframe 2, subframe 1, and subframe 0).

However, certain user equipment (UE) may not support the receipt of the additional SIB1 in subframe 3. For example, such UEs may only support the receipt of the SIB1 in subframe 4 and not subframe 3. For compatibility, a BS may transmit a bitmap that indicates whether the subframe 3 containing the additional SIB1 is invalid. However, despite the indication in the bitmap, a UE that supports receiving and processing the additional SIB1 in subframe 3 can also support having the subframe 3 in another frame, such as a future frame (e.g., when not containing the additional SIB1) as a valid subframe when the UE receives data in a UE-specific search space, thus increasing data throughput.

Accordingly, systems and methods in accordance with various embodiments harmonize an understanding of valid and/or invalid subframes between a BS and a UE. This understanding may be based on the BS coming to an understanding of whether a certain subframe (e.g., subframe 3) is a valid subframe for dynamic data allocation (e.g., the allocation of NPDCCH in a UE-specific search space, and NPDSCH scheduled by the NPDCCH in a UE-specific search space). This understanding may be facilitated by either the BS receiving capability information indicating that the UE supports receiving the additional SIB1 from the UE or from a core network. To be clear, the capability information may refer to information characterizing or indicating whether the UE supports certain subframe(s) (e.g., subframe 3), when not containing the additional SIB1, as a valid subframe or an invalid subframe. This capability information may be sent in a capability message.

For example, in certain embodiments a UE may inform a base station directly as to whether the UE supports the ability to receive an additional SIB1 (e.g., an SIB1 in subframe 3) in radio resource control (RRC) messaging and/or via a medium access control element (MAC CE). If the UE supports the ability to receive an additional SIB1, then the BS may optionally send a confirmation message to confirm that the BS has now determined that the subframe 3, when not containing the additional SIB1, can be considered as (e.g., designated as) a valid subframe to the UE via RRC messaging and/or via a MAC CE. After receiving the confirmation message, the UE may begin to utilize the subframe 3, when not containing the additional SIB1, also as a valid subframe for dynamic data allocations in future communications. In certain embodiments, this confirmation message may override a previous understanding of whether subframe 3 (or any other specific subframe) is a valid or invalid subframe by the bitmap in the MIB. For example, if a previously received bitmap indicated that subframe 3 is an invalid subframe, a subsequently received confirmation message that indicates that the subframe 3, when not containing the additional SIB1, is a valid subframe may override an effect of any notation that subframe 3 is an invalid subframe from the previously received bitmap.

However, if the UE does not support the ability to receive an additional SIB1, then such a confirmation message will not be sent from the BS to the UE. Stated another way, the receipt of the confirmation message is optional. Accordingly, the UE will not utilize subframe 3 as a valid subframe for dynamic data allocations in future communications. Rather, the UE will reserve subframe 3 as an invalid subframe that cannot be utilized for dynamic data allocation in future communications but is reserved for specific predetermined information in future communications.

In certain embodiments, the BS may not necessarily send the confirmation message even though the BS has come to an understanding that the UE supports the ability to receive an additional SIB1 (e.g., an SIB1 in subframe 3). In such embodiments, the BS and UE may operate with the implied understanding (e.g., without use of a confirmation message) that the BS understands and is operating based on the UE supporting the ability to receive the additional SIB1. This implied understanding may be based on the BS receiving the capability information indicating that the UE supports the ability to receive the additional SIB1.

In various embodiments, these future communications may include communications in the context of a narrowband physical downlink control channel (NPDCCH) in UE-specific search space. These future communications may also include communications in the context of a narrowband physical downlink shared channel (NPDSCH) transmission scheduled by the NPDCCH in a UE-specific search space after, optionally, receiving the confirmation message.

Figure 3:
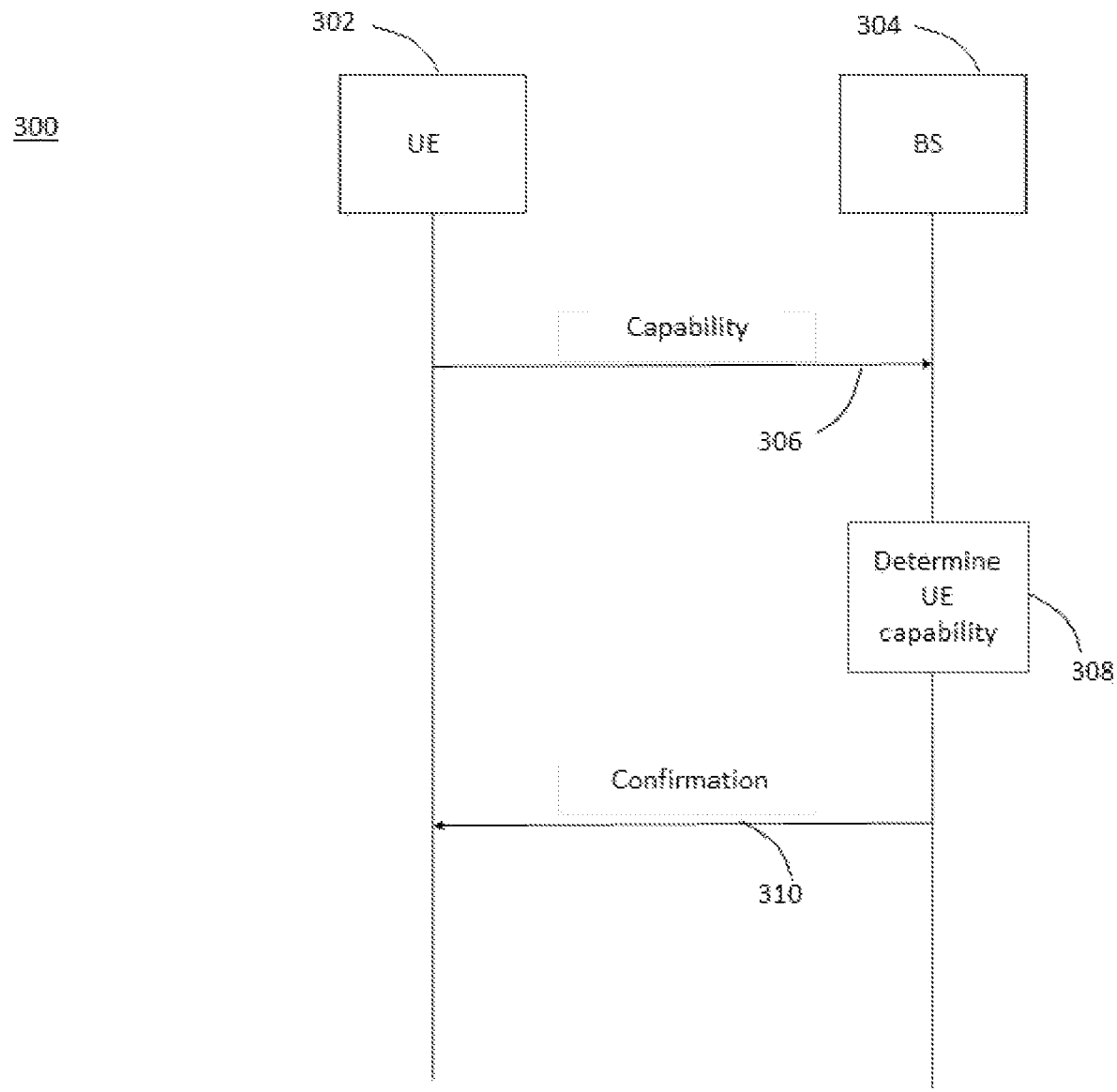
FIG. 3 is a flow chart of a process of communicating and confirming a UE capability to receive SIB1 in a subframe 3 from a BS, in accordance with some embodiments of the present disclosure.

FIG. 3 is a flow chart of a process 300 of communicating and confirming a UE 302 capability to receive SIB1 in a subframe 3 from a BS 304, in accordance with some embodiments of the present disclosure. The UE 302 and the BS 304 may be the same type of UE and/or BS as those illustrated above in FIGS. 1 and 2, but are remunerated in FIG. 3 onward for ease of explanation.

Returning to FIG. 3, at operation 306, the UE may communicate a capability message which includes capability information that indicates whether the UE 302 supports receiving the additional SIB1. At operation 308, the BS 304 may determine whether the UE can consider the subframe 3, when not containing the additional SIB1, as a valid subframe for reception of dynamic data allocation based on the capability information.

At operation 310, the BS 304 may, optionally, send a confirmation message to confirm that the BS 304 has now determined that the UE 302 supports subframe 3, when not containing the additional SIB1, as a valid subframe to the UE 302. This operation may be performed if the capability information indicates that the UE 302 supports receiving the additional SIB1. As will be illustrated below, this may be sent via RRC messaging and/or via a MAC CE. After receiving the confirmation message, the UE 302 may begin to utilize subframe 3, when not containing the additional SIB1, also as a valid subframe for dynamic data allocations in future communications.

However, if the UE 302 does not support the ability to receive an additional SIB1, then operation 310 may not be performed. If operation 310 is not performed, such a confirmation message will not be sent from the BS 304 to the UE 302. Accordingly, the UE 302 will not utilize subframe 3, when not containing the additional SIB1, as a valid subframe for dynamic data allocations in future communications. Rather, the UE 302 will reserve subframe 3 as an invalid subframe that cannot be utilized for dynamic data allocation in future communications but is reserved for specific predetermined information in future communications.

In certain embodiments, the confirmation message (e.g., operation 310) may override previous understandings of whether subframe 3 is a valid or invalid subframe. For example, the confirmation message may indicate that subframe 3, when not containing the additional SIB1, is a valid subframe, overriding a previous understanding that subframe 3 is an invalid subframe as indicated in a bitmap sent in a master information block (MIB).

Figure 4:
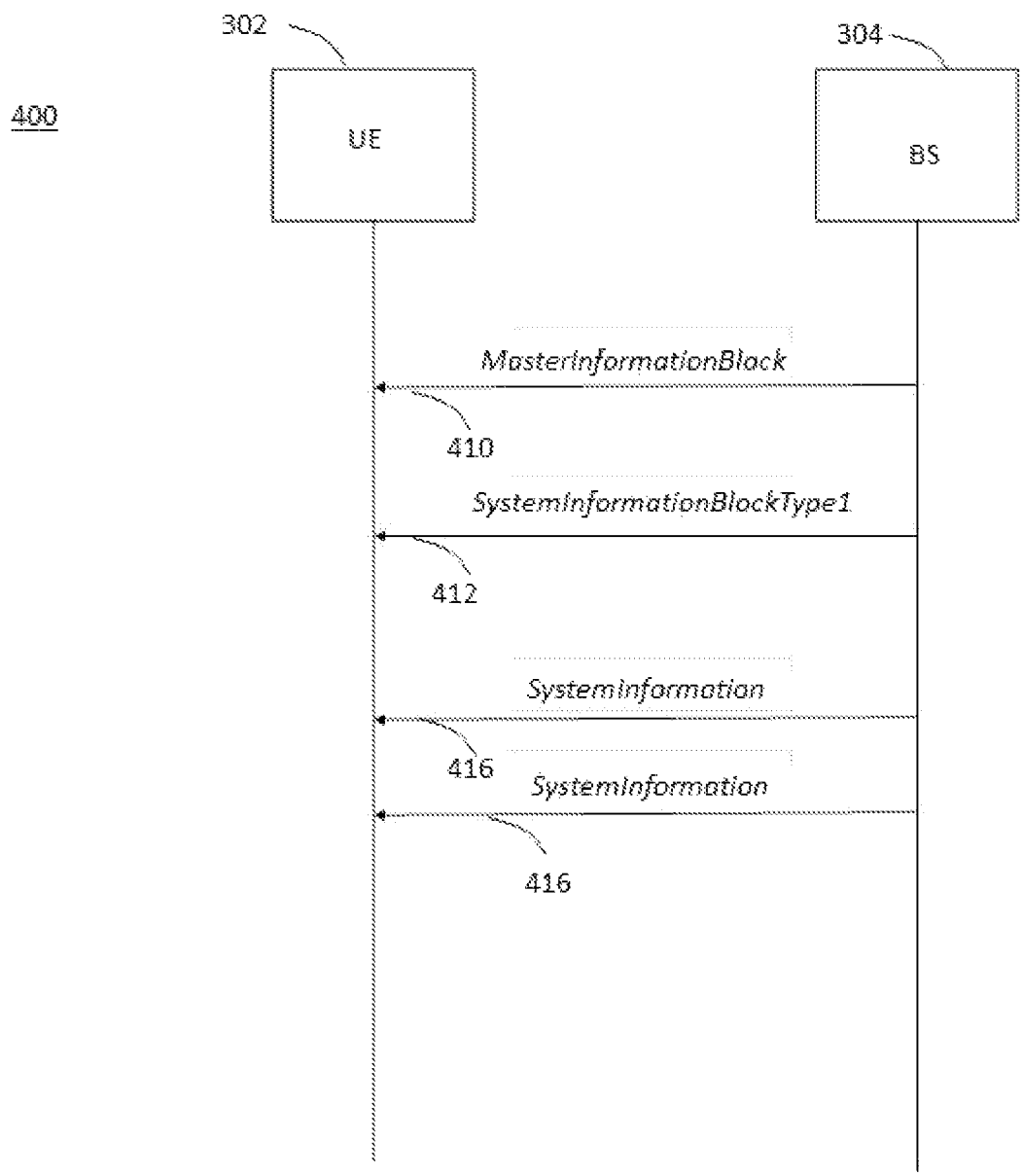
FIG. 4 is a flow chart of a process of transferring system information from the BS to the UE, in accordance with some embodiments of the present disclosure.

FIG. 4 is a flow chart of a process 400 of transferring system information from the BS 304 to the UE 302, in accordance with some embodiments of the present disclosure. At operation 410, the BS 304 may transmit the MIB to a UE. The MIB may include information that characterizes subsequent transmissions, such as the timing and/or characterization of subsequent transmissions.

As an example of arbitrary values that characterize subsequent transmissions, the BS may set a field of the MIB (e.g., additionalTransmissionSIB1) to True, the physical cell identifier (PCID) to 4 (e.g., PCID=4), and the number of repetitions of the SIB1 to 16. In certain embodiments, a specific subframe for transmission of an SIB1 may be set by the BS in accordance with the following formula:

$$SFN_i \bmod 256 = 2*i, i=0,1,\ldots,7,$$

where $SFN_i$ is a system frame number and i is an arbitrary value indicating the number of SIB1 subframe(s) within a SIB1 frame (e.g., 8 SIB1 subframes). For example, an MIB may indicate that subframe 3 is to transmit an additional SIB1 in addition to subframe 4 transmitting the SIB1. Also, a BS may broadcast a 10 millisecond downlink subframe bitmap of valid or invalid subframes, which may indicate whether subframe 3 is invalid. For example, the bitmap may be included in the subframePattern field of the MIB or the DL-Bitmap field of the MIB. Also, for example, a bitmap value of 1110111111 may indicate that subframe 3 of each radio frame is an invalid subframe (e.g., as the fourth subframe in a radio frame in time).

Figure 5:
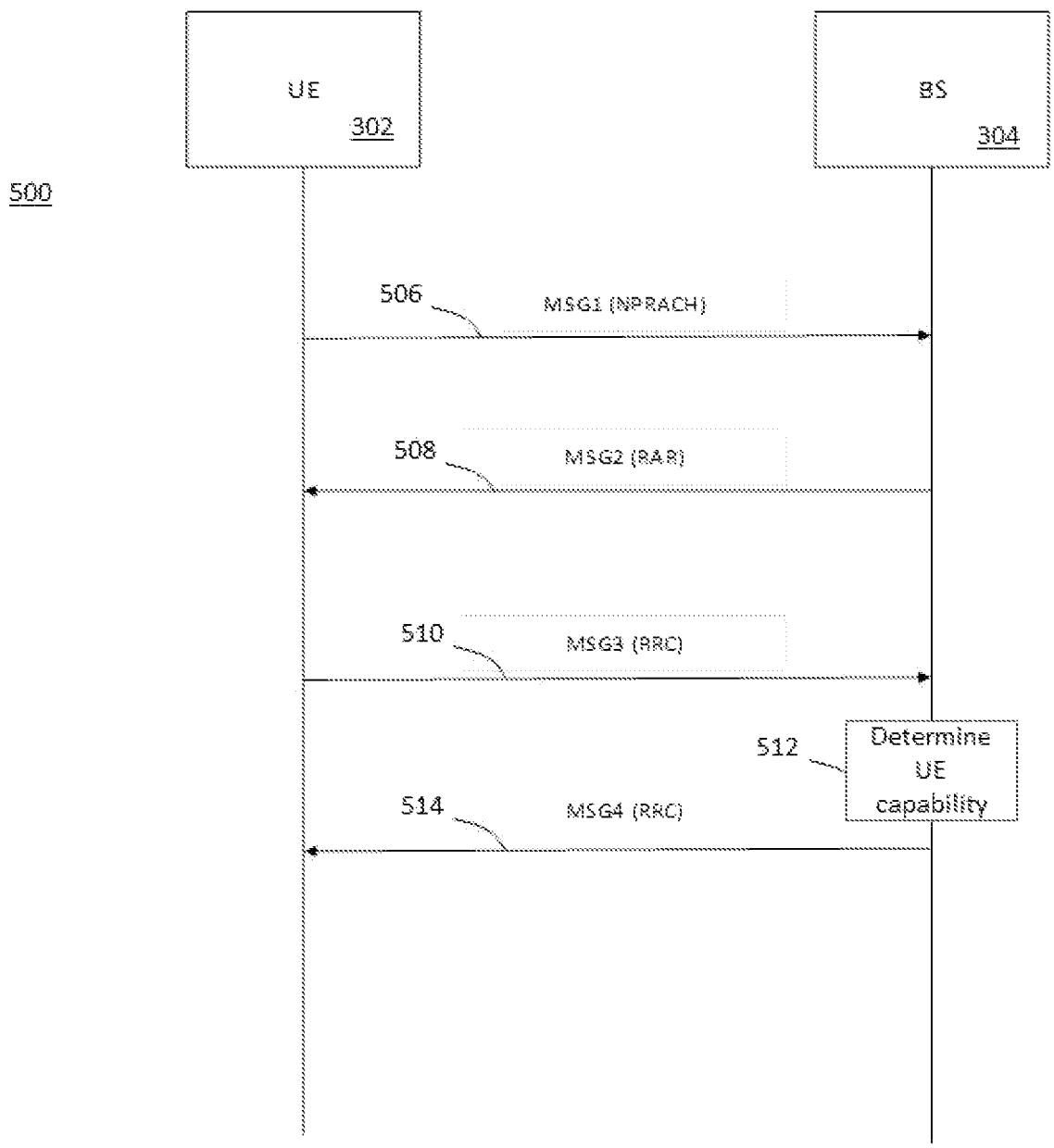
FIG. 5 is a flow chart of a process of communicating and confirming UE capability to receive SIB1 in subframe 3 directly between a UE and a BS in radio resource control (RRC) messaging, in accordance with some embodiments of the present disclosure.

At operation 412, the BS 304 may also transmit the SIB1 to the UE 302 after transmitting the MIB. At operation 416, further transmissions of other system information (e.g., SystemInformation) from the BS 304 to the UE 302 may follow after transmission of the SIB1. Process 400 may be referred to as precursor operations in the following figures FIG. 5 is a flow chart of a process 500 of communicating and confirming UE capability to receive SIB1 in subframe 3 directly between a UE 302 and a BS 304 in radio resource control (RRC) messaging, in accordance with some embodiments of the present disclosure. Process 500 may occur after process 400 of FIG. 4, discussed further above. Also, for simplicity of explanation, RRC messaging may be considered part of a set of five messages, as will be discussed further below. The set of five messages may be part of a random access procedure.

At operation 506, a first message (MSG1) of the set of five messages may be part of an NB-IoT physical random access channel (NPRACH) sent from the UE 302 to the BS 304.

At operation 508, a second message (MSG2) of the set of five messages may be a random access response (RAR) sent from the BS 304 to the UE 302.

At operation 510, the third message (MSG3) may be a RRC request message sent from the UE to the BS. At operation 510, the UE may include capability information that indicates whether the UE supports (e.g., is has the UE capability for) receiving the additional SIB1. Stated another way, the MSG3 RRC request message may be a capability message that includes capability information.

At operation 512, the BS 304 may determine whether the UE supports subframe 3, when not containing the additional SIB1, as a valid subframe for reception of dynamically allocated data or an invalid subframe for reception of dynamic data based on the RRC request message.

At operation 514, as a fourth message (MSG4) of the set of five messages, the BS 304 may send a RRC response message that includes a confirmation message if the capability information indicates that the UE 302 supports subframe 3, when not containing the additional SIB1, as a valid subframe for reception of dynamically allocated data. This confirmation message, as part of the RRC response message, may confirm that the BS 304 has now determined that the BS 304 supports considering subframe 3, when not containing the additional SIB1, as a valid subframe for the UE 302.

In certain embodiments, after receiving the confirmation message in operation 514, the UE 302 may begin to utilize subframe 3, when not containing the additional SIB1, as a valid subframe for dynamic data allocations in future communications. Also, the BS may utilize subframe 3, when not containing the additional SIB1, as a valid subframe for dynamic data allocations in future communications, thereby increasing data throughput. For example, the BS may dynamically allocate data in subframe 3, as a valid subframe, in a narrowband Physical Downlink Shared Channel (NPDSCH) and/or a narrowband Physical Downlink Control Channel (NPDCCH). Stated another way, the narrowband Physical Downlink Shared Channel (NPDSCH) and/or a narrowband Physical Downlink Control Channel (NPDCCH) may be received in a UE specific search space with a subframe 3 utilized as a valid subframe.

In various embodiments, the RRC response message of operation 514 may not include the confirmation message. The lack of this confirmation message, as part of the RRC response message, may confirm that the BS 304 has not determined that the BS 304 supports receiving an additional SIB1 in subframe 3 to the UE 302. Accordingly, the UE 302 and the BS 304 will not utilize subframe 3 as a valid subframe for dynamic data allocations in future communications. Rather, the UE 302 and the BS 304 will reserve subframe 3 as an invalid subframe that cannot be utilized for dynamic data allocation in future communications but is reserved for specific predetermined information in future communications. As noted above, these future communications may include communications in the context of a narrowband physical downlink control channel (NPDCCH) UE specific search space, and/or communications in the context of a narrowband physical downlink shared channel (NPDSCH) transmission scheduled by the NPDCCH in a UE specific search space.

Figure 6:
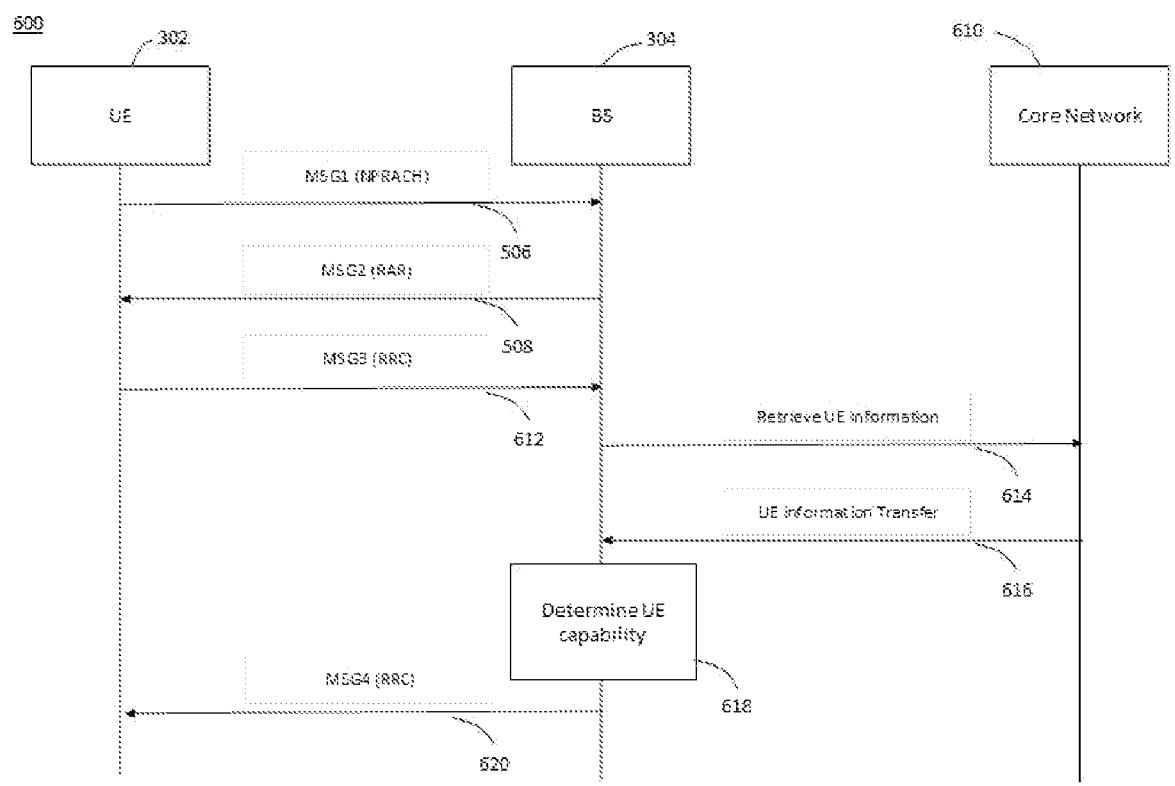
FIG. 6 is a flow chart of a process of communicating and confirming UE capability to receive SIB1 in a subframe 3 via a core network, in accordance with some embodiments of the present disclosure.

FIG. 6 is a flow chart of a process 600 of communicating and confirming UE capability to receive SIB1 in a subframe 3 via a core network, in accordance with some embodiments of the present disclosure. Operation 506 and operation 508 are already discussed above in connection with process 500 in FIG. 5 and will not be repeated here for brevity.

Returning to FIG. 6, at operation 612, the third message (MSG3) may be a RRC request message sent from the UE to the BS. At operation 612, unlike operation 510 of FIG. 5, the UE may not include capability information that indicates whether the UE supports receiving SIB1 in subframe 3. Stated another way, the MSG3 RRC request message may not be a capability message that includes capability information.

At operation 614, the BS 304 may send a retrieve UE information message to a core network 610. More specifically, the BS 304 may send the retrieve UE information message to a mobility management entity (MME) of the core network. The retrieve UE information message may request the core network 610 to communicate capability information that indicates whether the UE 302 supports receiving SIB1 in subframe 3.

At operation 616, the core network 610 may transmit a UE information transfer message that includes capability information characterizing whether the UE 302 supports receiving SIB1 in subframe 3. The capability information within the UE information transfer message may be stored at the core network 610, such as at the MME of the core network 610.

At operation 618, the BS 304 may determine whether the UE supports having subframe 3, when not containing the additional SIB1, as a valid subframe for reception of dynamically allocated data based on the capability information received in operation 616.

At operation 620, as a fourth message (MSG4) of the set of five messages, the BS 304 may send a RRC response message that includes a confirmation message if the capability information indicates that the UE 302 supports receiving SIB1 in subframe 3. This confirmation message, as part of the RRC response message, may confirm that the BS 304 has now determined that the BS 304 supports subframe 3, when not containing the additional SIB1, as a valid subframe for reception of dynamically allocated data for the UE 302.

In certain embodiments, after receiving the confirmation message in operation 620, the UE 302 may begin to utilize subframe 3, when not containing the additional SIB1, also as a valid subframe for dynamic data allocations in future communications. Also, the BS may utilize subframe 3, when not containing the additional SIB1, as a valid subframe for dynamic data allocations in future communications, thereby increasing data throughput. For example, the BS may dynamically allocate data in subframe 3, as a valid subframe, in a narrowband Physical downlink shared Channel (NPDSCH) and/or a narrowband Physical Downlink Control Channel (NPDCCH). Stated another way, the narrowband Physical Downlink Shared Channel (NPDSCH) and/or a narrowband Physical Downlink Control Channel (NPDCCH) may be received in a UE specific search space with a subframe 3 utilized as a valid subframe.

In various embodiments, the RRC response message of operation 620 may not include the confirmation message. The lack of this confirmation message, as part of the RRC response message, may confirm that the BS 304 has not determined that the BS 304 supports subframe 3, when not containing the additional SIB1, as a valid subframe for the UE 302. Accordingly, the UE 302 and the BS 304 will not utilize subframe 3 as a valid subframe for dynamic data allocations in future communications. Rather, the UE 302 and the BS 304 will reserve subframe 3 as an invalid subframe that cannot be utilized for dynamic data allocation in future communications but is reserved for specific predetermined information in future communications. As noted above, these future communications may include communications in the context of a NPDCCH UE specific search space, and/or communications in the context of a NPDSCH transmission scheduled by the NPDCCH in a UE specific search space.

Figure 7:
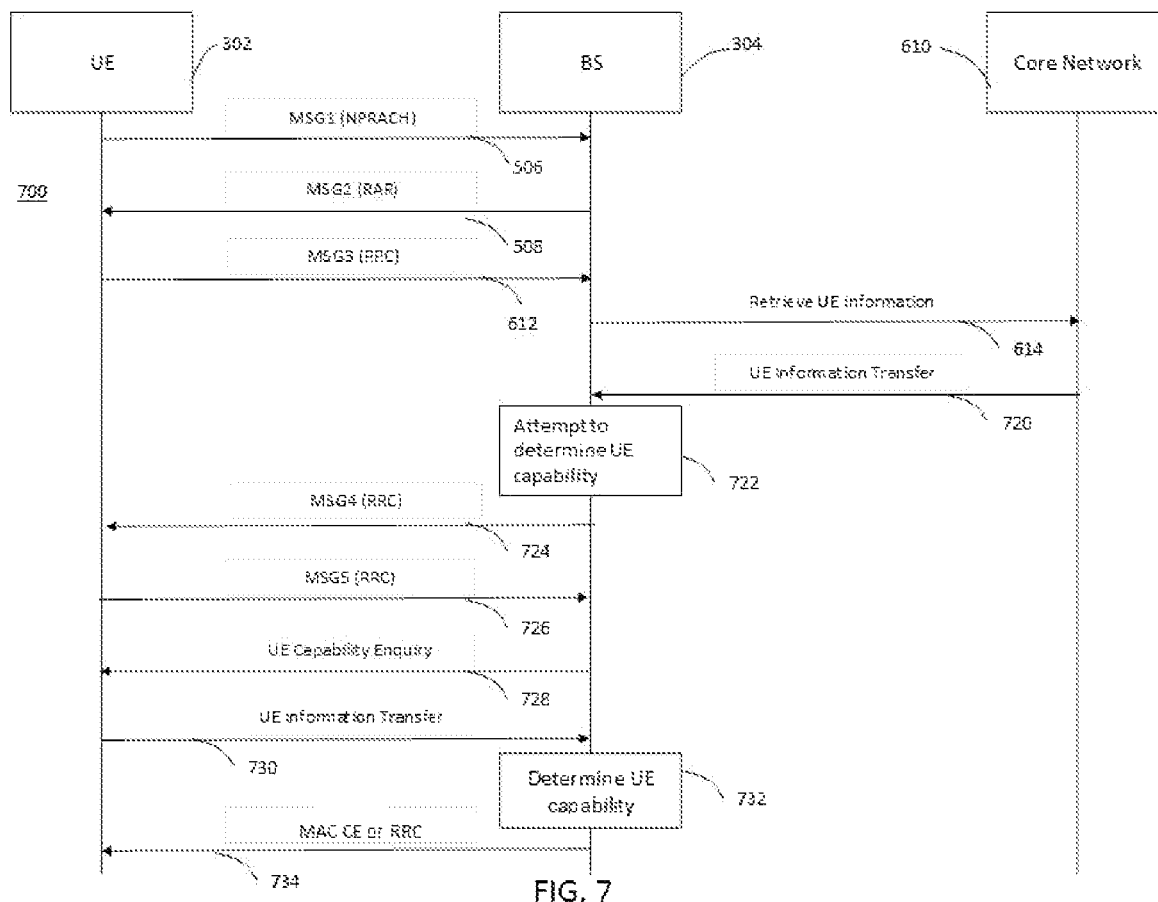
FIG. 7 is a flow chart of a process of communicating and confirming UE capability to receive SIB1 in subframe 3 when a core network does not include capability information, in accordance with some embodiments of the present disclosure.

FIG. 7 is a flow chart of a process 700 of communicating and confirming UE capability to receive SIB1 in subframe 3 when a core network does not include capability information, in accordance with some embodiments of the present disclosure. Operation 506 and operation 508 are already discussed above in connection with process 500 in FIG. 5 and will not be repeated here for brevity. Also, operation 612 and operation 614 are already discussed above in connection with process 600 in FIG. 6 and will not be repeated herein for brevity.

At operation 720, the core network 610 may transmit a UE information transfer message to the BS 304. However, unlike in operation 616 of FIG. 6, the UE information transfer message of operation 720 may not include capability information characterizing whether the UE 302 supports receiving SIB1 in subframe 3. This may be because the capability information may not be stored at the core network 610 (e.g., at the MME of the core network 610).

At operation 722, the BS 304 may attempt to determine whether the UE 302 supports receiving SIB1 in subframe 3 based on any capability information received in operation 720. However, the BS 304 has not received any capability information in operation 720 (e.g., operation 720 did not indicate whether or not the UE supports receiving SIB1 in subframe 3 based on any capability information received in operation 720). Therefore, the BS 304 is unable to, and has not determined whether or not the UE supports subframe 3, when not containing the additional SIB1, as a valid subframe for reception of dynamically allocated data.

At operation 724, as a fourth message (MSG4) of the set of five messages, the BS 304 may send a RRC response message to the UE 302. However, unlike operation 620 of FIG. 6, at operation 724 the RRC response message may not include a confirmation message. This may be because the BS 304 has not received any capability information in operation 720.

In certain embodiments, the RRC response message of operation 724 may specify that the BS has not received any capability information. In other embodiments, the RRC response message of operation 724 may simply not carry any information concerning the capability information (e.g., any information that indicates whether or not the UE supports subframe 3, when not containing the additional SIB1, is a valid subframe for reception of dynamically allocated data).

At operation 726, as a fifth message (MSG5) of the set of five messages, the UE 302 may send a RRC process completion message to the BS 304. The RRC process completion message may indicate that the random access procedure is now complete or has been completed.

At operation 728, the BS 304 may send a UE capability enquiry message to a core network 610. The UE capability enquiry message may request or query the UE 302 to communicate capability information that indicates whether the UE 302 supports receiving SIB1 in subframe 3.

At operation 730, the UE 302 may transmit an UE information transfer message that includes capability information characterizing whether the UE 302 supports receiving SIB1 in subframe 3. The UE information transfer message answers the UE capability enquiry message of operation 728. The UE information transfer message may be sent by the UE 302 in response to receiving the UE capability enquiry message. The capability information within the UE information transfer message may be stored at the UE 302.

At operation 732, the BS 304 may determine whether the UE supports subframe 3 as a valid subframe for reception of SIB1 based on the capability information received in operation 730.

At operation 734, the BS 304 may send a MAC CE or RRC message that includes a confirmation message if the capability information indicates that the UE 302 supports subframe 3 as a valid subframe for reception of SIB1. This confirmation message may confirm to the UE 302 that the BS 304 has now determined that the UE 302 supports subframe 3, when not containing the additional SIB1, as a valid subframe for reception of dynamically allocated data.

In certain embodiments, after receiving the confirmation message in operation 734, the UE 302 may begin to utilize subframe 3, when not containing the additional SIB1, also as a valid subframe for dynamic data allocations in future communications. Also, the BS may utilize subframe 3, when not containing the additional SIB1, as a valid subframe for dynamic data allocations in future communications, thereby increasing data throughput. For example, the BS may dynamically allocate data in subframe 3, as a valid subframe, in a narrowband Physical Downlink Shared Channel (NPDSCH) and/or a narrowband Physical Downlink Control Channel (NPDCCH). Stated another way, the narrowband Physical Downlink Shared Channel (NPDSCH) and/or a narrowband Physical Downlink Control Channel (NPDCCH) may be received in a UE specific search space with a subframe 3 utilized as a valid subframe.

In various embodiments, the MAC CE or RRC message of operation 514 may not include the confirmation message. The lack of this confirmation message, as part of the MAC CE or RRC message, may confirm that the BS 304 has not determined that the BS 304 supports subframe 3, when not containing the additional SIB1, as a valid subframe for reception of dynamically allocated data to the UE 302. Accordingly, the UE 302 and the BS 304 will not utilize subframe 3, when not containing the additional SIB1, as a valid subframe for dynamic data allocations in future communications. Rather, the UE 302 and the BS 304 will reserve subframe 3, when not containing the additional SIB1, as an invalid subframe that cannot be utilized for dynamic data allocation in future communications but is reserved for specific predetermined information in future communications. As noted above, these future communications may include communications in the context of a NPDCCH UE specific search space, and/or communications in the context of a NPDSCH transmission scheduled by the NPDCCH in a UE specific search space.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element or embodiment herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, one or more of the functions described in this document may be performed by means of computer program code that is stored in a "computer program product", "computer-readable medium", and the like, which is used herein to generally refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), which when executed, enable the computing system to perform the desired operations.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a communication device, comprising:
receiving a SystemInformationBlockType1 (SIB1) message in a first subframe of a frame from a communication node;
receiving an additional SIB1 message in a second subframe of the frame containing the additional SIB1 message from the communication node based on a communication device capability for processing the additional SIB1 message;
sending a radio resource control signal to the communication node based on the communication device capability for processing the additional SIB1 message in the second subframe of the frame containing the additional SIB1 message, wherein the radio resource control signal comprises an information element for indicating whether the communication device supports processing the additional SIB1 message in the second subframe containing the additional SIB1 message; and
utilizing a second subframe of another frame not containing the additional SIB1 message as a valid subframe based on a confirmation information associated with the second subframe of the another frame not containing the additional SIB1 message received from the communication node,
wherein:
the frame comprises ten contiguous subframes when the additional SIB1 message is absent in the frame, and
the second subframe is a fourth subframe out of the ten contiguous subframes.

2. The method according to claim 1, further comprising:
receiving a confirmation message from the communication node, the confirmation message comprising confirmation information; and
when the confirmation information indicates that the second subframe of the another frame not containing the additional SIB1 message is a valid subframe, performing at least one of:
monitoring a narrowband physical downlink control channel (NPDCCH) communication device specific search space, or
decoding a narrowband physical downlink shared channel (NPDSCH) transmission scheduled by the NPDCCH in a communication device specific search space.

3. The method according to claim 2, wherein the confirmation message is sent in a downlink radio resource control signal from the communication node to the communication device.

4. The method according to claim 1, wherein:
the frame containing the additional SIB1 message from the communication node to the communication device comprises ten contiguous subframes,
the first subframe is a fifth subframe out of the ten contiguous subframes, and
the second subframe containing the additional SIB1 message is a fourth subframe out of the ten contiguous subframes.

5. A communication device, comprising:
a receiver configured to:
receive a SystemInformationBlockType1 (SIB1) message in a first subframe of a frame from a communication node, and
receive an additional SIB1 message in a second subframe of the frame containing the additional SIB1 message from the communication node based on a communication device capability for processing the additional SIB1 message;
a transmitter configured to:
send a radio resource control signal to the communication node based on the communication device capability for processing the additional SIB1 message in the second subframe of the frame containing the additional SIB1 message, wherein the radio resource control signal comprises an information element for indicating whether the communication device supports processing the additional SIB1 message in the second subframe containing the additional SIB1 message; and at least one processor configured to:

utilize a second subframe of another frame not containing the additional SIB1 message as a valid subframe based on a confirmation information associated with the second subframe of the another frame not containing the additional SIB1 message received from the communication node, wherein:

the frame comprises ten contiguous subframes when the additional SIB1 message is absent in the frame, and the second subframe is a fourth subframe out of the ten contiguous subframes.

6. The communication device according to claim 5, wherein the receiver is further configured to:

receive a confirmation message from the communication node, the confirmation message comprising confirmation information; and wherein, when the confirmation information indicates that the second subframe of the another frame not containing the additional SIB1 message is a valid subframe, the communication device is configured to perform at least one of:

monitoring a narrowband physical downlink control channel (NPDCCH) communication device specific search space, or decoding a narrowband physical downlink shared channel (NPDSCH) transmission scheduled by the NPDCCH in a communication device specific search space.

7. The communication device according to claim 5, wherein:

the frame containing the additional SIB1 message from the communication node to the communication device comprises ten contiguous subframes, the first subframe is a fifth subframe out of the ten contiguous subframes, and the second subframe containing the additional SIB1 message is a fourth subframe out of the ten contiguous subframes.

8. The communication device according to claim 6, wherein the confirmation message is sent in a downlink radio resource control signal from the communication node to the communication device.

9. A non-transitory computer-readable medium storing instructions, wherein, the instructions, when executed by a processor of a communication device, are configured to cause the processor to perform:

receiving a SystemInformationBlockType1 (SIB1) message in a first subframe of a frame from a communication node;

receiving an additional SIB1 message in a second subframe of the frame containing the additional SIB1 message from the communication node based on a communication device capability for processing the additional SIB1 message; and sending a radio resource control signal to the communication node based on the communication device capability for processing the additional SIB1 message in the second subframe of the frame containing the additional SIB1 message, wherein the radio resource control signal comprises an information element for indicating whether the communication device supports processing the additional SIB1 message in the second subframe containing the additional SIB1 message; and utilizing a second subframe of another frame not containing the additional SIB1 message as a valid subframe based on a confirmation information associated with the second subframe of the another frame not containing the additional SIB1 message received from the communication node, wherein:

the frame comprises ten contiguous subframes when the additional SIB1 message is absent in the frame, and the second subframe is a fourth subframe out of the ten contiguous subframes.

10. The non-transitory computer-readable medium according to claim 9, wherein, the instructions, when executed by the processor, are configured to further cause the processor to perform:

receiving a confirmation message from the communication node, the confirmation message comprising confirmation information; and when the confirmation information indicates that the second subframe of the another frame not containing the additional SIB1 message is a valid subframe, performing at least one of:

monitoring a narrowband physical downlink control channel (NPDCCH) communication device specific search space, or decoding a narrowband physical downlink shared channel (NPDSCH) transmission scheduled by the NPDCCH in a communication device specific search space.

11. The non-transitory computer-readable medium according to claim 10, wherein the confirmation message is sent in a downlink radio resource control signal from the communication node to the communication device.

12. The non-transitory computer-readable medium according to claim 9, wherein:

the frame containing the additional SIB1 message from the communication node to the communication device comprises ten contiguous subframes, the first subframe is a fifth subframe out of the ten contiguous subframes, and the second subframe containing the additional SIB1 message is a fourth subframe out of the ten contiguous subframes.

* * * * *